(12) United States Patent
Sato et al.

(10) Patent No.: US 6,891,140 B2
(45) Date of Patent: May 10, 2005

(54) SINTERING FURNACE, METHOD OF MANUFACTURING SINTERED OBJECTS, AND SINTERED OBJECTS

(75) Inventors: Motoyasu Sato, Toki (JP); Sadatsugu Takayama, Tajimi (JP); Masatoshi Mizuno, Tajimi (JP); Seizo Obata, Tajimi (JP); Tadashi Shimada, Tajimi (JP); Toshio Hirai, Tajimi (JP)

(73) Assignees: Gifu Prefecture (JP); Japan As Represented by Director-General of National Institute For Fusion Science (JP)

( * ) Notice: Subject to any disclaimer, the term of this patent is extended or adjusted under 35 U.S.C. 154(b) by 0 days.

(21) Appl. No.: 10/312,492

(22) PCT Filed: Jan. 31, 2001

(86) PCT No.: PCT/JP01/00620

§ 371 (c)(1),
(2), (4) Date: Dec. 24, 2002

(87) PCT Pub. No.: WO02/32831

PCT Pub. Date: Apr. 25, 2002

(65) Prior Publication Data

US 2003/0111462 A1 Jun. 19, 2003

(30) Foreign Application Priority Data

Oct. 19, 2000 (JP) ..................................... 2000-319416
Oct. 19, 2000 (JP) ..................................... 2000-319417

(51) Int. Cl.⁷ ................................................ H05B 6/78
(52) U.S. Cl. ...................... 219/700; 219/681; 219/686
(58) Field of Search ............................... 219/678, 679, 219/680, 681, 684, 686, 690, 698, 700, 701, 736, 745, 752, 754, 756, 762

(56) References Cited

U.S. PATENT DOCUMENTS 4,307,277 A * 12/1981 Maeda et al. ............... 219/759
4,423,303 A * 12/1983 Hirose et al. .......... 219/121.36
4,822,966 A * 4/1989 Matsubara .................. 219/730

FOREIGN PATENT DOCUMENTS

| JP | 55-118588 | 9/1980 | |
|---|---|---|---|
| JP | 58-23349 | 5/1983 | |
| JP | 62-153620 | 7/1987 | ............. F23G/7/06 |
| JP | 1-216522 | 8/1989 | ......... H01L/21/205 |
| JP | 1-315984 | 12/1989 | ........... H05B/11/00 |
| JP | 03-257072 | 11/1991 | |
| JP | 04-092870 | 3/1992 | |
| JP | 04-240387 | 8/1992 | |
| JP | 06-087663 | 3/1994 | |
| JP | 6-172012 | 6/1994 | ........... C04B/33/32 |
| JP | 10-149941 | 6/1998 | ............ H01G/4/12 |
| JP | 11-234972 | 8/1999 | .......... H02K/15/02 |
| JP | 2000-16807 | 1/2000 | ........... C01B/31/04 |

* cited by examiner

*Primary Examiner*—Tu Hoang
(74) *Attorney, Agent, or Firm*—Fish & Richardson P.C.

(57) ABSTRACT

A sintering furnace for sintering an object to be sintered formed of ceramics, fine ceramic materials, etc. to produce a sintered object and a method therefor. An insulating wall (28) and an inner shell (25) define a sintering chamber (16) for sintering an object to be sintered (10). Thermal equilibrium is maintained between the inner shell (25) and the object to be sintered (10), and the object to be sintered (10) is completely pseudo-adiabatically isolated to achieve more uniform and small energy consuming sintering. The thickness of the insulating wall (28) increases gradually from an inlet (20) toward an outlet (21). The object to be sintered (10) is fed by a carriage provided in a sintering furnace from the inlet (20) to the outlet (21) in the sintering chamber (16). Thereby, a temperature distribution corresponding to a plurality of processes can be easily formed in one furnace to sinter continuously the object to be sintered (10) in the furnace.

11 Claims, 4 Drawing Sheets

SINTERING FURNACE, METHOD OF MANUFACTURING SINTERED OBJECTS, AND SINTERED OBJECTS

BACKGROUND OF THE INVENTION

The present invention relates to a sintering furnace for sintering an object to be sintered formed of ceramics, fine ceramic materials, etc. to produce a sintered object, a method of manufacturing a sintered object, and a sintered object.

Conventionally, an electric furnace or a gas furnace has been used as a sintering furnace for sintering an object to be sintered. However, since the temperature in a furnace must be raised gradually in order not to generate any temperature differences between the surfaces and the interiors of the object to be sintered in the case of such furnaces where the object to be sintered is heated from outside, there has been a problem that sintering time is liable to be longer.

Accordingly, in order to solve such a problem, Japanese Examined Patent Publication No. Sho 58-23349, Japanese Laid-Open Patent Publication No. Hei 3-257072 and Japanese Laid-Open Patent Publication No. Hei 6-87663 propose various sintering furnaces using microwaves. Microwaves are absorbed uniformly both onto the surfaces and into the interiors of the objects to be sintered. Therefore, there is only a little fear that any temperature differences occur during heating between the surfaces and interiors of the object to be sintered. Consequently, the rate of temperature rise can be increased to shorten the time necessary for the sintering to a large extent as well as uniform sintering can be accomplished. Sintering the objects to be sintered with microwaves is expected as such a technology that decreases energy necessary for the sintering as well as increases productivity of producing sintered objects, especially ceramics for industrial use.

The inventors of the present invention found that when sintering is conducted using microwaves, a pseudo-adiabatic space completely insulating an object to be sintered is created by surrounding the object to be sintered with a thermal insulating material which has an equivalent microwave absorption property to that of the object to be sintered. In this case, occurrence of thermal gradient in the object to be sintered due to radiation cooling can be restrained and more uniform sintering can be accomplished.

However, since energy of the microwaves is absorbed and consumed not only in the object to be sintered but also in the insulating material in the case of sintering the object to be sintered surrounded by the above insulating material, the amount of energy necessary for the sintering increases significantly.

In order to restrain the amount of energy consumed in the insulating material, it is necessary to make the insulating material thinner to decrease its weight and heat capacity. However, if the insulating material is made thinner, the amount of thermal energy lost by heat conduction out of the insulating material becomes larger to such a degree that cannot be neglected, compared to the amount of thermal energy given by the microwaves to the insulating material. Accordingly, there occurs a large temperature difference between the inside surface of the insulating material and the object to be sintered. Consequently, the above assumption of pseudo-adiabatic space will not be established resulting in occurrence of thermal gradient in the object to be sintered due to radiation cooling.

Therefore, a first object of the present invention is to provide a sintering furnace where occurrence of thermal gradient in an object to be sintered due to radiation cooling can be restrained while attempting to reduce energy necessary for sintering the object to be sintered, and a method of manufacturing an object to be sintered, and a sintered object.

For intending mass production of sintered objects, a tunnel type continuous sintering furnace is preferable where a plurality of processes can be carried out continuously. In the continuous sintering furnace, it is necessary to form an appropriate temperature distribution in the furnace by changing the temperature in the furnace in the direction of carrying the objects to be sintered. The reason is because each process (for example, drying, preliminary sintering, main sintering) of the sintering processes must be done in the particular temperature region within the furnace corresponding thereto.

However, in the case of the sintering with microwaves, formation of a proper temperature distribution in the furnace, which is a continuous cavity, is difficult, because electric power density of the microwaves is dispersed and uniformized through repetition of multiple reflection of microwaves within the furnace.

Therefore, a second object of the present invention is to provide a continuous sintering furnace where a temperature distribution corresponding to a plurality of processes can be easily formed in one furnace and an object to be sintered can be continuously sintered with microwaves in the furnace, and a method of manufacturing an object to be sintered, and a sintered object.

DISCLOSURE OF THE INVENTION

According to an embodiment of the present invention, a sintering furnace for sintering objects to be sintered with microwaves is provided. The sintering furnace comprises an inner shell, which can heat itself with microwaves, and a microwave generator. The inner shell defines a sintering chamber and the objects to be sintered are disposed in the sintering chamber. The microwave generator radiates microwaves to the objects to be sintered via the inner shell. The amount of heat generated with the microwaves per unit volume of the inner shell is larger than the amount of generated heat per unit volume of the objects to be sintered. The temperature of the inside surface of the inner shell is substantially the same as the surface temperature of the objects to be sintered.

According to another embodiment of the present invention, provided is a method of manufacturing sintered objects where the sintered objects are formed by radiating microwaves to objects to be sintered. The method comprises the steps of: i) providing an inner shell which can heat itself with microwaves and which defines a sintering chamber; ii) disposing objects to be sintered within the sintering chamber, the amount of heat generated with the microwaves per unit volume of the inner shell being larger than the amount of generated heat per unit volume of the objects to be sintered; iii) forming sintered objects by radiating microwaves with a microwave generator to the objects to be sintered via the inner shell in order to make the temperature of the inside surface of the inner shell substantially the same as the surface temperature of the objects to be sintered.

According to still another embodiment of the present invention, a sintered object obtained through the above method is provided.

According to another embodiment of the present invention, provided is a continuous sintering furnace for sintering objects to be sintered with microwaves. The continuous sintering furnace comprises an insulating wall permeable to microwaves, a microwave generator and a feeding system. The insulating wall defines a sintering chamber and the objects to be sintered are disposed in the sintering chamber. The microwave generator radiates microwaves to the objects to be sintered via the insulating wall. The feeding system feeds the objects to be sintered into the sintering chamber. The temperature within the sintering chamber is changed in order to correspond to the sintering process of the objects to be sintered in the direction of feeding the objects to be sintered.

According to yet another embodiment of the present invention, provided is a method of manufacturing sintered objects where the sintered objects are formed by radiating microwaves to objects to be sintered. The method comprises the steps of: i) providing an insulating wall permeable to microwaves, the insulating wall defining a sintering chamber; ii) disposing the objects to be sintered within the sintering chamber by a feeding system; iii) forming the sintered objects by radiating microwaves with a microwave generator via the insulating wall to the objects to be sintered carried into the sintering chamber so that the temperature within the sintering chamber is changed in order to correspond to the sintering process of the objects to be sintered in the feeding direction of the objects to be sintered.

According to still another embodiment of the present invention, sintered objects obtained through the above method are provided.

DETAILED DESCRIPTON OF THE PREFERRED EMBODIMENTS

In the following, the embodiments of the present invention are described on the basis of the drawings in order to describe the present invention in more detail. Unless otherwise mentioned, like reference numbers refer to like members throughout the drawings.

(Sintering Furnace)

Figure 1:
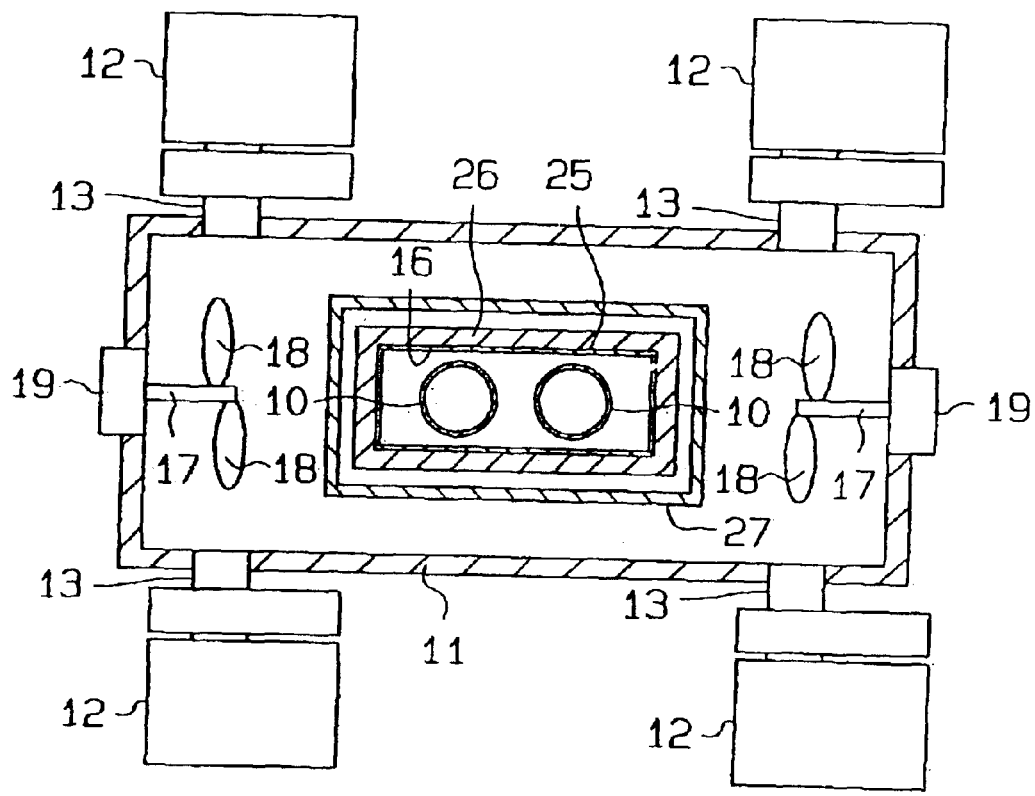
FIG. 1 is a schematic sectional plan view showing an embodiment of the sintering furnace of the present invention.

FIG. 1 is a schematic sectional view showing the sintering furnace of a first embodiment. The sintering furnace is used to manufacture sintered objects by sintering an object to be sintered 10. The object to be sintered 10 is composed of an object molded into a predetermined shape from a ceramic material or a fine ceramic material. The object to be sintered 10 can be any one selected from a molded object, an unglazed molded object, a glazed molded object, and an article obtained by glazing an unglazed molded object.

The sintering furnace comprises a chamber 11 composed of a closed container. The chamber 11 is able to reflect microwaves at least on the inside surface thereof. In the present embodiment, the chamber 11 is formed in the shape of a square box made of stainless steel with 2 m in length, 1.1 m in width, and 1.1 m in height.

Microwave oscillators 12 as the microwave generator are connected to the chamber 11 via waveguides 13. Microwaves are radiated into the chamber 11 via the waveguides 13. The frequency of the microwaves is preferably 0.9 to 100 GHz, more preferably 0.9 to 10 GHz, most preferably 2.45 GHz. The frequency lower than 0.9 GHz is not preferable because wavelength becomes very long and brings about reduction in absorptance of microwave. On the contrary, the frequency higher than 100 GHz is not preferable because an expensive microwave oscillator 12 is necessary. When the frequency of the microwaves is 2.45 GHz, the microwave oscillator 12 can be rather small and low in price. In the present embodiment, used are six microwave oscillators 12 (only four of them are shown in FIG. 1) which output 2.45 GHz microwave (output 1.5 kW).

An auxiliary insulating wall 27 defines space within the chamber 11. The auxiliary insulating wall 27 is adiabatic as well as permeable to microwaves. Both a main insulating wall 26 and an inner shell 25 disposed within the main insulating wall 26 define a sintering chamber 16 in the space, which is defined by the auxiliary insulating wall 27. The inner shell 25, the main insulating wall 26 and the auxiliary insulating wall 27 compose a bracket surrounding the object to be sintered 10. The volume of the sintering chamber 16 is preferably 0.3 to 0.6 m$^3$.

The main insulating wall 26 is adiabatic as well as permeable to microwaves. A material having adiabatic performance such as alumina fiber, alumina foam is given as a material for forming the main insulating wall 26.

On the other hand, the inner shell 25 heats itself with microwaves. The amount of heat generated with the microwaves per unit volume of the inner shell 25 must be essentially larger than the amount of generated heat per unit volume of the object to be sintered 10 and may preferably be equal to or smaller than 2 times thereof. As a material for forming the inner shell 25 given are mullite based materials, silicon nitride based materials and alumina, and they are provided for selection depending on the object to be sintered 10. Further, a metal oxide such as magnesia, zirconia or iron oxide, or an inorganic material such as silicon carbide all of which have large microwave absorptance can be added in a small amount to the material for forming the inner shell 25. The thickness of the inner shell 25 is preferably in a range of 1 to 2 mm.

Further, the sintering furnace comprises a microwave stirring system for stirring microwaves irradiated into the chamber 11. The microwave stirring system includes a rotary shaft 17 extending inward from the inside surface of the chamber 11, a plurality of stirring vanes 18 supported by the rotary shaft 17 and a driving motor 19 for rotating the stirring vanes 18 around the rotary shaft 17 on its axis.

Next, the manufacturing method of sintered objects using the above sintering furnace will be described.

When the sintered object is manufactured, an object to be sintered 10 is first made through molding ceramic material or fine ceramic material into the predetermined shape. The object to be sintered 10 is placed in the sintering chamber 16. Subsequently, the microwave oscillator 12 is actuated to radiate microwaves into the chamber 11. The microwaves radiated into the chamber 11 are transmitted through the main insulating wall 26 and the auxiliary insulating wall 27 and absorbed into the inner shell 25 and the object to be sintered 10 to be converted into thermal energy. This increases the temperature of the inner shell 25 and the object to be sintered 10.

Since the thickness of the inner shell 25 of the present embodiment is thinner than that of conventional one, there is a possibility that the amount of thermal energy lost due to heat conductivity from the inner shell 25 to the outside becomes larger to such a degree that cannot be neglected compared with the amount of thermal energy gained by the inner shell 25 with the microwaves. However, the amount of heat generated per unit volume of the inner shell 25 is larger than the amount of heat generated per unit volume of the object to be sintered 10. Therefore, by this difference between the amount of heat generated in the inner shell 25 and that in the object to be sintered 10, compensated is the difference between the inside surface temperature of the inner shell 25 and the surface temperature of the object to be sintered 10. Consequently, the thermal equilibrium between the inner shell 25 and the object to be sintered can be maintained to make the inside surface temperature of the inner shell 25 substantially equal to the surface temperature of the object to be sintered 10. This shows that the object to be sintered 10 is completely pseudo-adiabatically insulated. The fact that the inside surface temperature of the inner shell 25 is substantially the same as the surface temperature of the object to be sintered 10 refers to that the temperature difference between the two is such a difference as not to create any harmful thermal strain. The temperature difference is preferably equal to or less than 20° C.

Further, since the inner shell 25 is heated while maintaining the thermal equilibrium with the object to be sintered 10, the thermal energy lost through radiation from the object to be sintered 10 is canceled by the thermal energy radiated from the inside surface of the inner shell 25 to the object to be sintered 10. At this time, the radiation loss of the object to be sintered 10 becomes zero in principle. That is, the sintering chamber 16 acts as a closed space for the object to be sintered 10, which is pseudo-adiabatically completely insulated. Thus, the occurrence of thermal gradient due to radiation cooling in the object to be sintered 10 is restrained.

Figure 2:
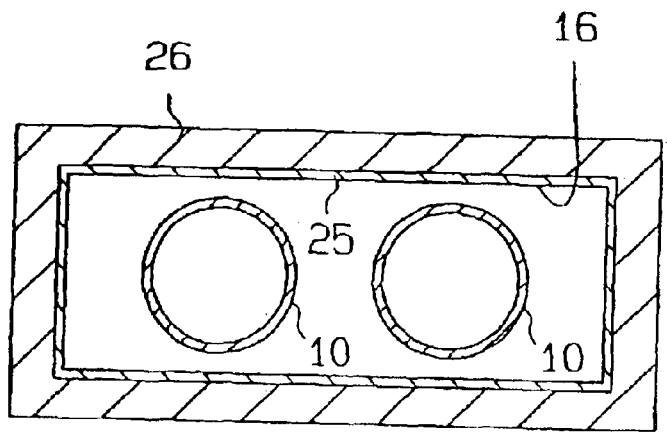
FIG. 2 is an enlarged schematic sectional plan view showing the sintering chamber.

According to a theoretical analysis, as shown in FIG. 2, when it is assumed that the object to be sintered 10 of one dielectric is surrounded at an appropriate distance apart by the inner shell 25 of the other dielectric, thermal conduction equations can be written as the following equations (1) and (2).

$$\partial\theta_1/\partial t = \kappa_1(\partial^2\theta_1/\partial x^2 + \partial^2\theta_1/\partial y^2 + \partial^2\theta_1/\partial z^2) + \sigma(\theta_2^4 - \theta_1^4) + 2\pi f/(c_1\rho_1)E^2\in_0\in_{r1} \tan \delta_1 \quad (1)$$

$$\partial\theta_2/\partial t = \kappa_1(\partial^2\theta_2/\partial x^2 + \partial^2\theta_2/\partial y^2 + \partial^2\theta_2/\partial z^2) + \sigma(\theta_1^4 - \theta_2^4) + 290 f/(c_2\rho_2)E^2\in_0\in_{r2} \tan \delta_2 \quad (2)$$

Where $\theta$ is the temperature; $\kappa$ is the heat conductivity; c is the specific heat; $\rho$ is the density; t is the time; x, y, z are the positions; $\sigma$ is the Stefan-Boltzmann constant; f is the frequency; E is the field intensity; $\in_r$ is the relative permittivity of a material; $\in_0$ is the permittivity of vacuum; and $\delta$ is the loss angle. The suffix "1" refers to the object to be sintered 10, and the suffix "2" refers to the inner shell 25.

In an ideally adiabatic state, the difference between thermal incomings and outgoings through radiation, heat conduction and heat transfer is set at zero on the surface of the object to be sintered 10. Such a state is realized when the temperature of the surface of the object to be sintered 10 is equal to that of the inside surface of the inner shell 25, namely at thermal equilibrium. In other words, since there is no energy loss from the surface of the object to be sintered 10, that is, no heat flux from the interior of the object to be sintered 10 to the surface, the temperature gradient $\partial\theta_1/\partial x$, $\partial\theta_1/\partial y$, $\partial\theta_1/\partial z$ becomes zero.

Consequently, the above equation (1) is expressed as follows:

$$\partial\theta_1/\partial t = 2\pi f/(c_1\rho_1)E^2\in_0\in_{r1} \tan \delta_1 \quad (1')$$

The above equation (2) is also expressed as follows:

$$\partial\theta_2/\partial t = P_{rf}/(c_2\rho_2)\in_{r2} \tan \delta_2 - P_{loss}/(c_2\rho_2) \quad (2')$$

Where X=0, $\partial\theta_1/\partial t = \partial\theta_2/\partial t$, $\theta_1 = \theta_2$. Further, the inner shell 25 is a closed space or equivalent to a closed space. In order that the thermal equilibrium may be established at the inside surface of the inner shell 25, the incomings and outgoings of energy at the inside surface of the inner shell 25 must be zero, namely $\partial\theta/\partial x = 0$ must be held true at the inside surface of the inner shell 25. Therefore, the condition, which satisfies the equation (2'), is expressed in the following equation (3):

$$\in_{r1} \tan \delta_1/c_1\rho_1 = \in_{r2} \tan \delta_2/c_2\rho_2 - P_{loss}/P_{rf} \quad (3)$$

and, wherein $P_{rf} (=2\pi f E^2 \in_0)$ means electric power density of microwave, and $P_{loss}$ means energy lost outward from the inner shell 25.

The present embodiment described in detail above has the following effects.

The thermal energy lost through radiation from the object to be sintered 10 is canceled by the thermal energy radiated from the inside surface of the inner shell 25, and the radiation loss of the object to be sintered 10 is zero in principle. Therefore, the occurrence of thermal gradient due to radiation cooling in the object to be sintered 10 is restrained, so that more uniform sintering can be carried out in comparison with the conventional sintering furnaces with microwave. Thereby, the occurrence of strains and cracks in the object to be sintered 10 can be restrained.

The amount of heat generated with microwaves per unit volume of the inner shell 25 is larger than the amount of heat generated with those per unit volume of the object to be sintered 10. Therefore, the weight and the heat capacity of the inner shell 25 can be turned small by making the thickness thereof thinner while maintaining the thermal equilibrium between the object to be sintered 10 and the inner shell 25. Thus, the reduction of energy amount necessary for sintering the object to be sintered 10 can be realized by restraining the amount of energy consumed within the inner shell 25.

The heat loss of the inner shell 25 can be effectively suppressed by the fact that the main insulating wall 26 having the adiabatic performance and the permeability to microwave is provided on the outer surface of the inner shell 25.

The sintering furnace includes a plurality of microwave oscillators 12 and also a plurality of incident holes through which the microwaves output from the microwave oscillator 12 are transmitted into the chamber 11. Therefore, it can be restrained that the spotted uneven sintering comes out due to concentration of electric field on only a part of the object to be sintered 10.

(Continuous Sintering Furnace)

Continuous Sintering Furnace of the First Embodiment

Figure 3:
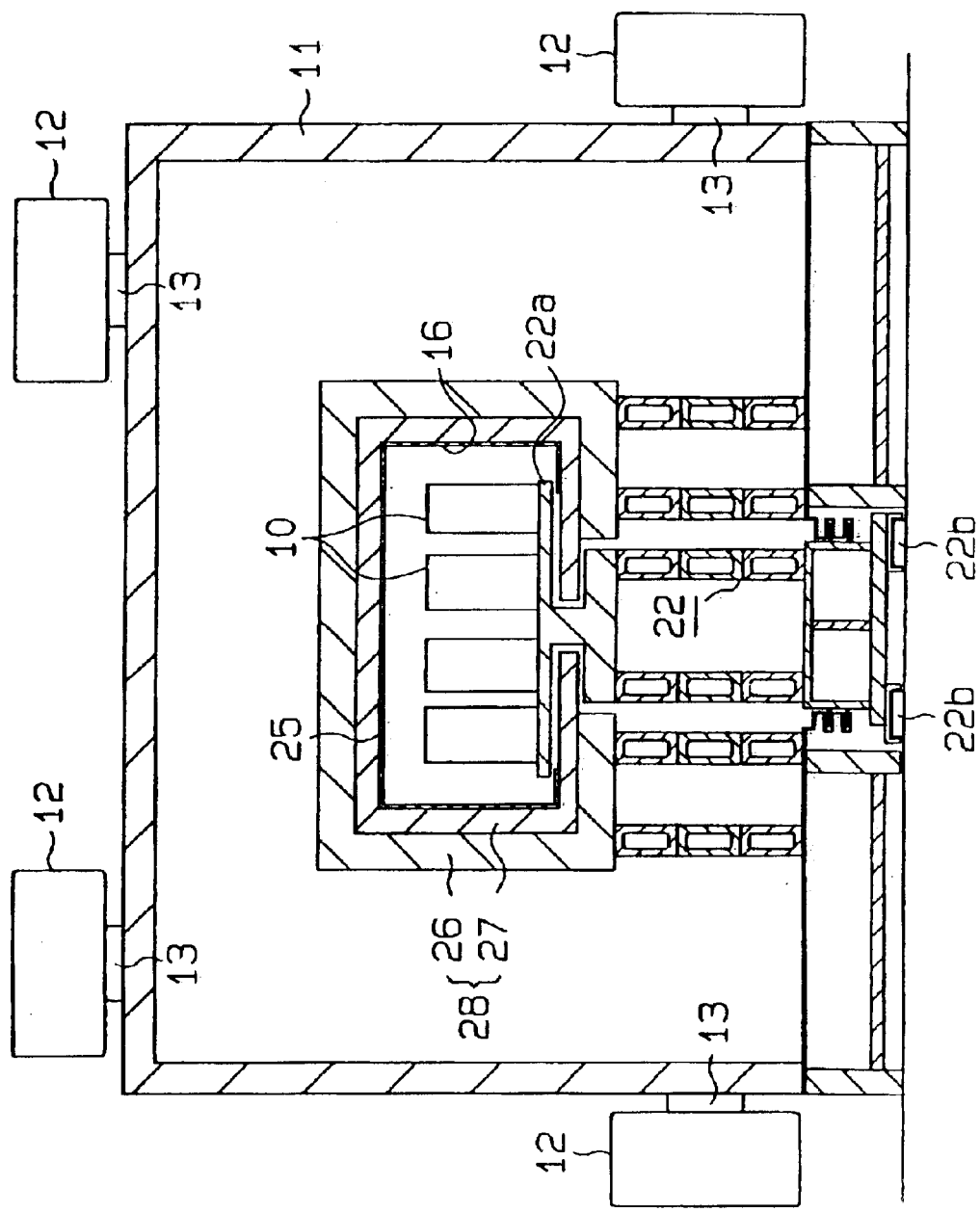
FIG. 3 is a schematic sectional side view showing a first embodiment of the continuous sintering furnace.
Figure 4:
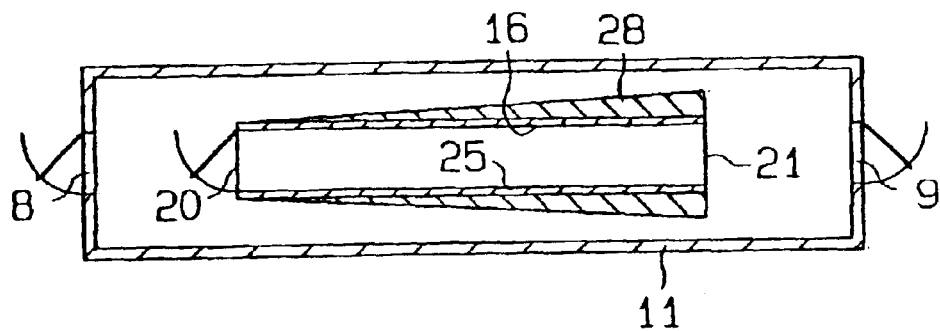
FIG. 4 is an enlarged schematic sectional plan view showing the sintering furnace in FIG. 3.

FIG. 3 is a schematic sectional side view showing a first embodiment of the continuous sintering furnace. FIG. 4 is an enlarged schematic sectional plan view showing the sintering furnace in FIG. 3. The sintering furnace shown in these figures is used to manufacture a sintered object by continuously sintering an object to be sintered.

The continuous sintering furnace comprises a chamber 11 in the shape of a tunnel extending linearly. The chamber 11 is able to reflect microwaves at least on the inside surface thereof. The chamber 11 is made of stainless steel. As shown in FIG. 4, openings are disposed at both end portions of the chamber 11, and one is an inlet 8 (the opening on the left-hand side in FIG. 4) and the other is an outlet 9 (the opening on the right-hand side in FIG. 4).

As shown in FIG. 3, like the furnace in FIG. 1, microwave oscillators 12 as the microwave generator are connected via waveguides 13 to the chamber 11. The microwaves output from the microwave oscillator 12 are radiated into the chamber 11 via the waveguide 13. The frequency of the microwaves is preferably 0.9 to 100 GHz, more preferably 0.9 to 10 GHz, most preferably 2.45 GHz, as in the case of the sintering furnace in FIG. 1.

In FIG. 4, an insulating wall 28 defines a sintering chamber 16 extending linearly in the longitudinal direction of the chamber 11. Openings are disposed at both end portions of the insulating wall 28, and one is an inlet 20 (the opening on the left-hand side in FIG. 4) and the other is an outlet 21 (the opening on the right-hand side in FIG. 4).

The insulating wall 28 is adiabatic as well as permeable to microwaves. The insulating wall 28 is configured in order for the thickness thereof to increase gradually from the inlet 20 to the outlet 21. A material having adiabatic performance such as alumina fiber, alumina foam is given as a material for forming this insulating wall 28. In the present embodiment, the insulating wall 28 includes a first insulating wall 26 and a second insulating wall 27.

Preferably, within the insulating wall 28 provided is an inner shell 25, which heats itself with microwaves. The amount of heat generated with the microwaves per unit volume of the inner shell 25 is preferably larger than the amount of heat generated per unit volume of the object to be sintered 10 and is equal to or smaller than 2 times thereof. As a material for forming the inner shell 25 given are mullite based materials, silicon nitride based materials and alumina, and they are provided for selection depending on the object to be sintered 10. Further, a metal oxide such as magnesia, zirconia or iron oxide, or an inorganic material such as silicon carbide all of which have large microwave absorptance can be added in a small amount to the material for forming the inner shell 25. The thickness of the inner shell 25 is preferably 1 to 2 mm.

Further, a feeding system is provided in the continuous sintering furnace for feeding the object to be sintered 10 from the inlet 20 to the outlet 21 in the sintering chamber 16. In the present embodiment, the feeding system includes a carriage 22. As shown in FIG. 3, the carriage 22 has a mount portion 22a for mounting the object to be sintered 10 thereon and rollers 22b coupled with the mount portion 22a for moving the carriage. The carriage 22 not only transfers the object to be sintered 10 within the sintering chamber 16 but also feeds them from the inlet 8 of the chamber 11 to the inlet 20 of the sintering chamber 16 and feeds them from the outlet 21 of the sintering chamber 16 to the outlet 9 of the chamber 11. The feeding of the object to be sintered 10 by the carriage 22 is preferably performed at a constant feed speed.

The manufacturing method of a sintered object using the above continuous sintering furnace will be described below.

When a sintered object is manufactured, the object to be sintered 10 is first made through molding ceramic material or fine ceramic material into the predetermined shape. The object to be sintered 10 is disposed on the mount portion 22a of the carriage 22, and is fed into the sintering chamber 16 through the inlet 20 with the carriage 22. Next, the microwave oscillator 12 is actuated to radiate microwaves into the chamber 11. The incident microwaves are transmitted through the insulating wall 28 and absorbed into the inner shell 25 and the object 10 to be converted into thermal energy resulting in the temperature rise of both the inner shell 25 and the object to be sintered 10.

In the present embodiment, the thickness of the insulating wall 28 increases gradually from the inlet 20 toward the outlet 21 and the adiabatic effect of the insulating wall 28 also increases from the inlet 20 toward the outlet 21. Therefore, the temperature within the sintering chamber 16 increases from the inlet 20 toward the outlet 21. Consequently, feeding of the object to be sintered 10 from the inlet 20 to the outlet 21 means gradual feeding of the object to be sintered 10 from the low temperature region to the high temperature region.

Figure 5:
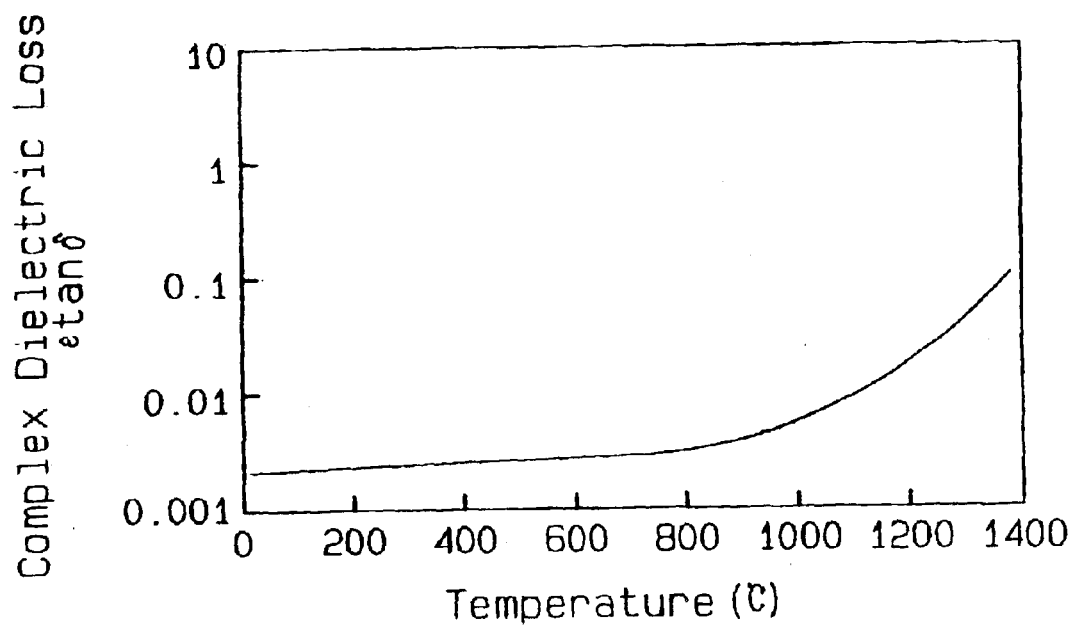
FIG. 5 is a graph showing the temperature dependence of complex dielectric loss of the insulating wall.

FIG. 5 is a graph showing the temperature dependence of complex dielectric loss of the insulating wall 28. As shown in the figure, the complex dielectric loss of the insulating wall 28 is almost proportional to a temperature up to several hundred degrees Celsius and increases exponentially at the temperature region higher than that.

The present embodiment described in detail above has the following effects.

The temperature within the sintering chamber 16 is set to increase from the inlet 20 toward the outlet 21 by making the thickness of the insulating wall 28 increase gradually from the inlet 20 to the outlet 21. Therefore, each process step of the object to be sintered 10 such as drying, preliminary sintering, main sintering, etc. in the sintering process of the object to be sintered 10 can be executed sequentially at a proper temperature. Thus, the sintered object can be manufactured by continuously sintering the object to be sintered 10 in a single sintering furnace.

The thickness of the insulating wall 28 varies in the feeding direction of the object to be sintered 10. This makes it easy to form a particular temperature distribution in the sintering chamber 16.

The object to be sintered 10 is surrounded in the sintering chamber 16 by the inner shell 25 which can heat itself with microwaves. Since the amount of thermal energy gained in the inner shell 25 by microwaves is sufficiently larger than the amount of thermal energy lost by conduction from the inner shell 25, the heat equilibrium can be maintained between the inside surface of the inner shell 25 and the object to be sintered 10. Consequently, the object to be sintered are pseudo-adiabatically completely isolated. Thereby, occurrence of thermal gradient in the object to be sintered 10 due to radiation cooling can be restrained and more uniform sintering can be accomplished.

Continuous Sintering Furnace of the Second Embodiment

A continuous sintering furnace of the second embodiment of the present invention will be described in detail on the basis of the drawings focusing on the differences from the first embodiment.

Figure 6:
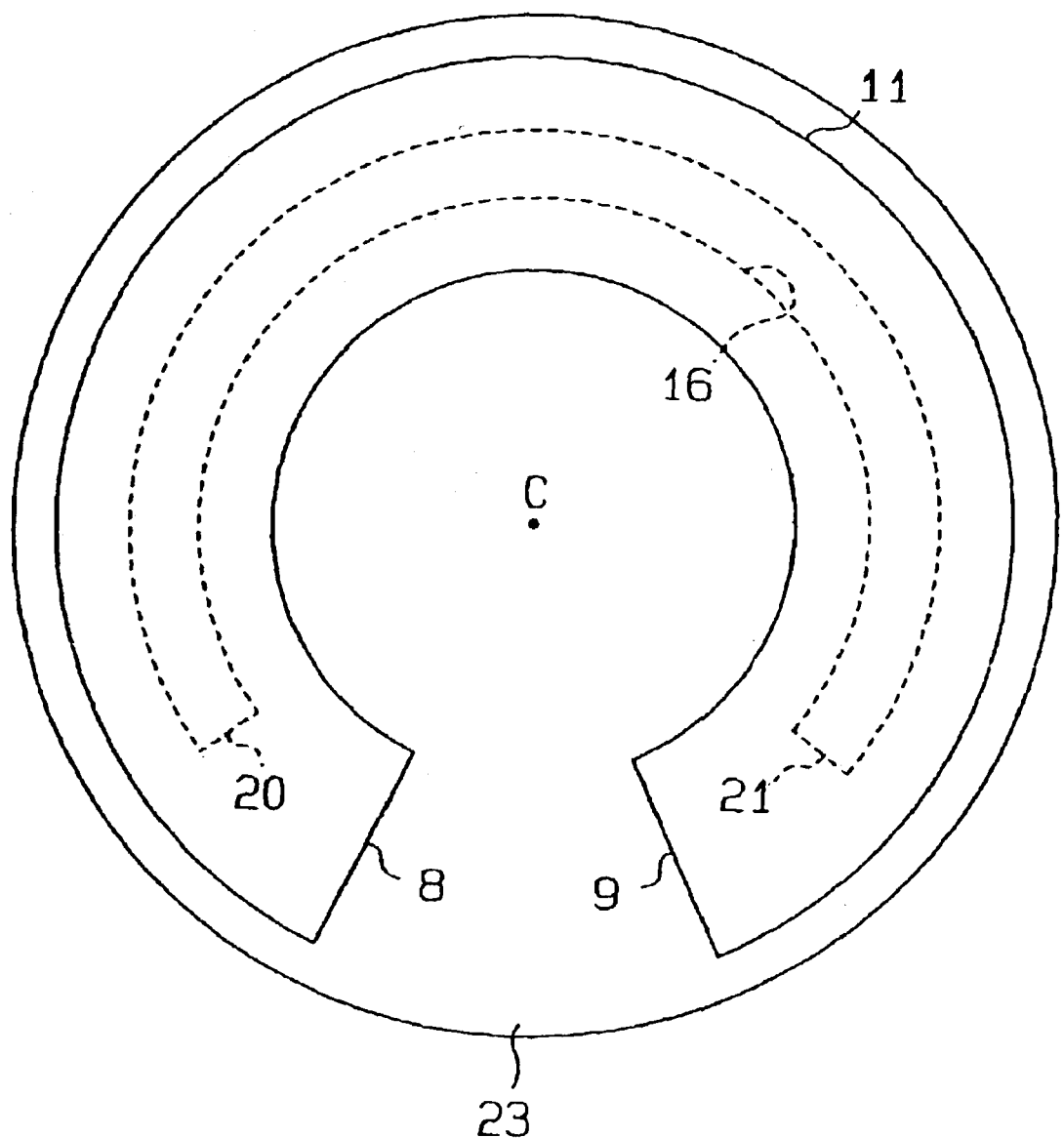
FIG. 6 is a schematic plan view showing a second embodiment of the continuous sintering furnace.

FIG. 6 is a schematic plan view showing the second embodiment of the continuous sintering furnace. A chamber 11 is formed in a circular arc shape or a C-shape, and a sintering chamber 16 is also formed in a circular arc shape or a C-shape corresponding to the former.

Further, this continuous sintering furnace includes a furnace bed 23 in the shape of a disk. The furnace bed 23 can rotate about the center point C. An object to be sintered 10 is disposed on the furnace bed 23. The object to be sintered 10 is fed from an inlet 20 to an outlet 21 in the sintering chamber 16 by the rotation of the furnace bed 23. A feeding system in the second embodiment includes the furnace bed 23 and a driving system (not shown) such as a motor for driving the furnace bed 23.

The present embodiment has the following effects.

The linear sintering chamber 16 having the same lengths is affected by the portions with different temperatures of an insulating wall 18. However, the sintering chamber 16 in the circular arc shape or a C-shape is affected by the smaller region of the insulating wall 18 than that of the linear sintering chamber 16. The inner area of the insulating wall 28, which can be seen in the feeding direction from the object to be sintered 10 in the same region of the sintering chamber 16, is small. Therefore, occurrence of spotted uneven sintering on the object to be sintered, due to the heat transferred from the portions with different temperatures of the insulating wall 28, can be restrained.

Since the feeding system includes the furnace bed 23 and a driving system for driving the furnace bed 23 to rotate, manufacturing is simple.

It is apparent to those skilled in the art that the present invention can be embodied in various different specific modes without departing from the spirit or the scope of the present invention. Particularly, it is to be understood that the present invention can be embodied in the following modes.

The sintering furnace may further comprise a pre-treatment chamber for drying or subjecting the object to be sintered 10 to unglazed baking in advance. In this case, the pre-treatment chamber is disposed to be in parallel with the sintering chamber 16. The object to be sintered 10 disposed in the pre-treatment chamber is dried or subjected to unglazed baking with outward radiation heat or transmitting microwaves originated from microwaves irradiated into the sintering chamber by the microwave generator 12. By this procedure, thermal efficiency in drying or baking the object to be sintered 10 with no glaze can be enhanced.

The adiabatic performance or microwave absorptance of the insulating wall 28 can be changed in the feeding direction of the object to be sintered 10 by forming a portion of the insulating wall 28 with a material different from the other portion. Alternatively, the adiabatic performance or microwave absorptance of the insulating wall 28 can be changed in the feeding direction of the object to be sintered 10 by forming a portion of the insulating wall 28 in a density different from the other portion. In either case, the temperature in the sintering chamber 16 can be changed in the feeding direction.

The insulating wall 28 may be 1-layered or more than 2-layered in addition to 2 layers.

The feeding system can be changed to such a feeding system that includes a driving system having a belt conveyer and a motor and the like for driving the belt conveyer. Further, in the continuous sintering furnace of the second embodiment, the feeding system can be replaced with a feeding system having a carriage 22 as in the first embodiment.

In place of increasing the thickness of the insulating wall 28 gradually from the inlet 20 to the outlet 21, the portion with a constant thickness or the portion with decreasing thickness may be partially provided. Further, the variation in thickness may not only be continuous but also stepwise.

In place of increasing the temperature in the sintering chamber 16 gradually from the inlet 20 to the outlet 21, the portion with a constant temperature or the portion with decreasing temperature may be partially provided in the feeding direction. Further, the variation in temperature in the sintering chamber 16 may not necessarily be continuous but stepwise.

EXAMPLES

Example 1

A sintered object (ceramics) was obtained by sintering the object to be sintered 10 (weight: 10 kg, average thickness: 5 mm) made of a ceramic material using the sintering furnace of the embodiment shown in FIG. 1.

In this Example 1, the inner shell 25 was formed of mullite-based porcelain and the main insulating wall (outer shell) 26 was formed of an alumina-fiber board. Additionally, the inner shell 25 was 8 mm thick and 45 kg in weight, and the main insulating wall 26 was 40 mm thick and 5 kg in weight. The physical properties of the inner shell 25, the main insulating wall 26 and the object to be sintered 10 are shown in Table 1. The penetration depth represents an entering depth at which the electric power density of microwaves attenuates half of that in each material.

TABLE 1

| | Material | Heat conductivity (kW/m ° C.) | Relative permittivity | Dielectric loss (tan δ) | Density (kg/m$^3$) | Specific heat (kJ/kg ° C.) | Penetration depth (m) |
|---|---|---|---|---|---|---|---|
| Inner shell | Mullite-series porcelain | $2.1 \times 10^{-3}$ | 6.5 | $1.5 \times 10^{-3}$ | $1.7 \times 10^3$ | 0.8 | 3.4 |
| Outer shell | Alumina-fiber board | $0.1 \times 10^{-3}$ | 9.5 | $3 \times 10^{-5}$ $(0.2/3.6 \times 10^{-4})$ | $0.2 \times 10^3$ | 0.11 | 150 |
| Object to be sintered | Ceramics material | $1.18$ to $1.59 \times 10^{-3}$ | 6 | $1.5 \times 10^{-3}$ | $2$ to $3 \times 10^3$ | 0.88 | 3.5 |

Example 2

A sintered object (ceramics) was obtained by sintering the object to be sintered 10 (weight: 10 kg, average thickness: 5 mm) made of a ceramic material using the sintering furnace of the embodiment shown in FIG. 1.

In this Example 2, the inner shell 25 was formed of mullite-based cement added with 0.1% of iron oxide (FeO) and the main insulating wall (outer shell) 26 was formed of an alumina-fiber board. Additionally, the inner shell 25 was 2 mm thick and 5 kg in weight, and the main insulating wall 26 was 40 mm thick and 5 kg in weight. The physical properties of the inner shell 25, the main insulating wall 26 and the object to be sintered 10 are shown in Table 2.

TABLE 2

| | Material | Heat conductivity (kW/m ° C.) | Relative permittivity | Dielectric loss (tan δ) | Density (kg/m$^3$) | Specific heat (kJ/kg ° C.) | Penetration depth (m) |
|---|---|---|---|---|---|---|---|
| Inner shell | Mullite-series cement + FeO | $2.1 \times 10^{-3}$ | 6.5 | $1.8 \times 10^{-3}$ | $1.7 \times 10^3$ | 0.8 | 3.0 |
| Outer shell | Alumina-fiber board | $0.1 \times 10^{-3}$ | 9.5 | $3 \times 10^{-5}$ $(0.2/3.6 \times 5 \times 10^{-4})$ | $0.2 \times 10^3$ | 0.11 | 150 |
| Object to be sintered | Ceramics material | $1.18$ to $1.59 \times 10^{-3}$ | 6 | $1.5 \times 10^{-3}$ | $2$ to $3 \times 10^3$ | 0.88 | 3.5 |

Example 3

A sintered object was obtained by sintering the object to be sintered 10 (weight: 10 kg, average thickness: 5 mm) made of high purity (99%) alumina with the sintering furnace of the embodiment shown in FIG. 1.

In this Example 3, the inner shell 25 was formed out of alumina added with 1 mol % of zirconia and the main insulating wall (outer shell) 26 was formed of an alumina-fiber board. Additionally, the inner shell 25 was 1 mm thick and 0.2 kg in weight, and the main insulating wall 26 was 40 mm thick and 5 kg in weight. The physical properties of the inner shell 25, the main insulating wall 26 and the object to be sintered 10 are shown in Table 3.

TABLE 3

| | Material | Heat conductivity (kW/m ° C.) | Relative permittivity | Dielectric loss (tan δ) | Density (kg/m$^3$) | Specific heat (kJ/kg ° C.) | Penetration depth (m) |
|---|---|---|---|---|---|---|---|
| Inner shell | Alumina + zirconia | $2.4 \times 10^{-3}$ | 9.5 | $0.8 \times 10^{-3}$ | $3 \times 10^3$ | 0.8 | 3.0 |
| Outer shell | Alumina-fiber board | $0.1 \times 10^{-3}$ | 9.5 | $3 \times 10^{-5}$ $(0.2/3.6 \times 5 \times 10^{-4})$ | $0.2 \times 10^3$ | 0.11 | 150 |
| Object to be sintered | High purity alumina | $2.4 \times 10^{-3}$ | 6 | $0.5 \times 10^{-3}$ | $3 \times 10^3$ | 0.8 | 3.5 |

The examples and the embodiments of the present invention are illustrative and not intended to restrict the present invention. The present invention should not be limited to the details described in the present specification and can be changed without departing from the scope of the appended claims and the equivalents thereof.

As described above, the sintering furnace and the manufacturing method of sintered object according to the present invention are useful for manufacturing the sintered objects by sintering objects to be sintered made of ceramic materials or fine ceramic materials, and are particularly suitable for executing not only a single step but also a plurality of steps of the manufacturing process of the objects to be sintered.

What is claimed is:

1. A continuous sintering furnace for sintering an object to be sintered with microwaves comprising:
    an insulating wall permeable to microwaves, wherein the insulating wall defines a sintering chamber and the object to be sintered are disposed in the sintering chamber;
    a microwave generator for radiating microwaves to the object to be sintered via the insulating wall; and
    a feeding system for feeding the object to be sintered into the sintering chamber,
    wherein the temperature within the sintering chamber is changed in order to correspond to a sintering process of the object to be sintered in a feeding direction of the object to be sintered by changing the thickness of the insulating wall in the feeding direction.

2. The continuous sintering furnace according to claim 1, wherein the temperature within the sintering chamber is changed in order to correspond to the sintering process of the object to be sintered in the feeding direction of the object to be sintered by changing adiabatic performance of microwave absorptance of the insulating all in the feeding direction.

3. The continuous sintering furnace according to claim 1, wherein the sintering chamber comprises an inlet and an outlet facing the inlet and the feeding system feeds the object to be sintered from the inlet through the sintering chamber to the outlet.

4. The continuous sintering furnace according to claim 3, wherein the thickness of the insulating wall increases gradually from the inlet toward the outlet.

5. The continuous sintering furnace according claim 1, wherein the sintering chamber is formed in the shape of a circular arc.

6. The continuous sintering furnace according to claim 1, wherein the feeding system has a furnace bed disposed below the sintering chamber on which the object to be sintered is disposed and the object to be sintered is fed by rotation of the furnace bed.

7. The continuous sintering furnace according to claim 1, wherein the sintering chamber is formed in the shape of a straight line.

8. the continuous sintering furnace according to claim 1, wherein the feeding system includes a carriage having a mount portion on which the object to be sintered is disposed and a roller coupled to the mount portion in order to move the carriage, and the object to be sintered is disposed on the mount portion and carried by movement of the carriage.

9. The continuous sintering furnace according to claim 1, further comprising, within the insulating wall, an inner shell which is able to heat itself with microwaves;

wherein the inner wall surrounds the object to be sintered.

10. The continuous sintering furnace according claim 1, further comprising, within the insulating wall, an inner shell which is able to heat itself with microwaves;

wherein the inner wall surrounds the object to be sintered, and the amount of heat generated with the microwaves per unit volume of the inner shell is larger than the amount of heat generated per unit volume of the object to be sintered, and also the temperature of the inside surface of the inner shell is substantially the same as the surface temperature of the object to be sintered.

11. The continuous sintering furnace according to claim 1, further comprising a pre-treatment chamber disposed to be in parallel with the sintering chamber;

wherein the object to be sintered disposed in the pre-treatment chamber is dried or baked using no glaze with radiation heat or transmitting microwaves from the outer surface of the insulating wall originated from microwaves irradiated into the sintering chamber by the microwave generator.

* * * * *